(12) United States Patent
Nusbickel

(10) Patent No.: US 6,301,711 B1
(45) Date of Patent: Oct. 9, 2001

(54) SYSTEM AND METHOD FOR THE NETWORK SUPPORT OF FULL MOTION VIDEO USING A REDUNDANT ARRAY OF INEXPENSIVE DISKS

(75) Inventor: Wendi Lynn Nusbickel, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/159,647

(22) Filed: Nov. 30, 1993

(51) Int. Cl.[7] .............................. H04N 7/10; G06F 15/16
(52) U.S. Cl. .............................. 725/93; 725/87; 719/219; 711/114
(58) Field of Search ..................................... 395/164, 166, 395/200, 425, 600; 348/7; 707/1, 10, 104, 205; 709/203, 214, 219; 711/114

(56) References Cited

U.S. PATENT DOCUMENTS

| | | | |
|---|---|---|---|
| 5,164,909 | 11/1992 | Leonhardt et al. | 364/478 |
| 5,262,875 | * 11/1993 | Mincer | 358/335 |
| 5,313,585 | * 5/1994 | Jeffries | 395/275 |
| 5,440,336 | * 8/1995 | Buhro | 348/13 |

OTHER PUBLICATIONS

Kinnaman, D.: "Jostens Launches Full–Motion Video on Networks", Technology & Learning, v13, n1, p35(2), Sep. 1992.*

Liebman, S.: "Video on a Network: The List of Potential Applications for Networked Video is Long, but the Technology Still Lags", Computer Graphics World, v16, n3, p46, 4/93.*

Morse, S.: "Starlight Shines Real Multimedia on a Network", Network Computing, p40 Jul. 1993.*

Smalley, Eric,: "Fast Forward to LAN–Based Video", Network World, v10, n30, pp: S39–S42, Jul. 1993.*

"Networked Full–Motion Digital Video", IBM International Technical Support Centers Multimedia in a Network Environment, No. GG24–3947–00, Chapter 5, New York, U.S., pp. 101–108.

Wendi Nusbickel and John Albee, "Networked Full Motion Digital Video", IBM OS/2 Developer, vol. 4, No. 4, Florida, U.S., pp. 81–89.

* cited by examiner

Primary Examiner—Ulka J. Chauhan
(74) Attorney, Agent, or Firm—Jeffrey S. LaBaw; Bracewell & Patterson, L.L.P.

(57) ABSTRACT

Distinct full motion video segments may be reproduced on a plurality of playback platforms by storing duplicate video segments on each of a plurality of direct access storage devices. In response to a request for a video segment, a direct access storage device for retrieval of the video segment is selected from among devices listed in a drive information table. The selected direct access storage device is then instructed to retrieve the video segment. Finally, the drive information table is updated to reflect use of the selected direct access storage device for retrieval.

16 Claims, 4 Drawing Sheets

| DRIVE ID (101) | STATUS FLAG (103) | MAX STREAMS SUPPORTED (105) | USED (107) |
|---|---|---|---|
| 81 | 1 | 5 | 2 |
| 82 | 1 | 3 | 1 |
| 83 | 1 | 4 | 2 |
| 84 | 0 | 6 | 0 |

*Fig. 3*

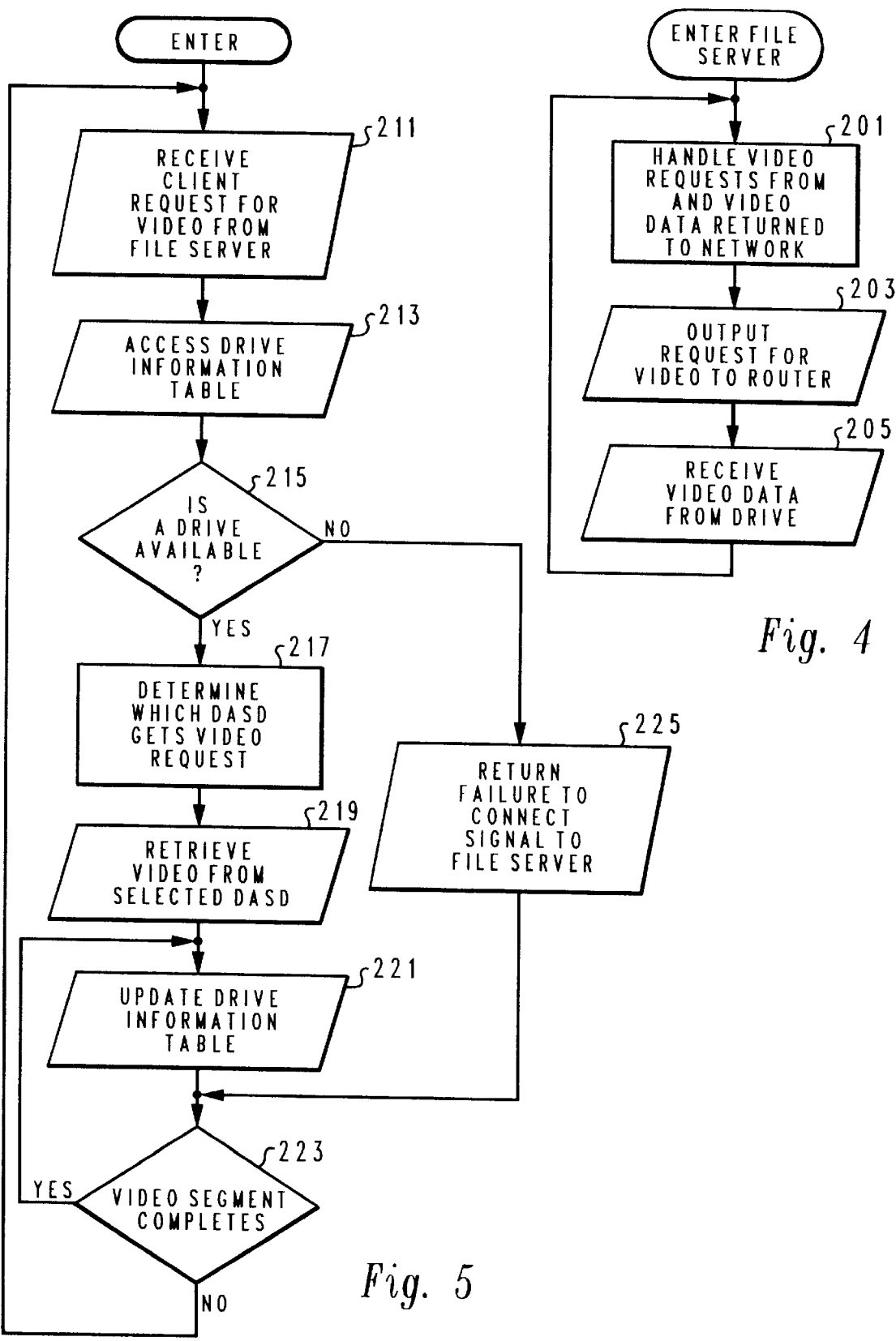

SYSTEM AND METHOD FOR THE NETWORK SUPPORT OF FULL MOTION VIDEO USING A REDUNDANT ARRAY OF INEXPENSIVE DISKS

BACKGROUND OF THE INVENTION

1. Technical Field

The invention relates to a system and method of reproducing asynchronous full motion video on a plurality of nodes of a network from a Redundant Array of Inexpensive Disks type mass storage system.

2. Description of the Related Art

Use of disk memory continues to be important in computers because it is nonvolatile and because memory size demands continue to outpace practical amounts of main memory. For conventional data processing applications, single disks deliver data at rates slower than the system central processing unit (CPU) can utilize it. While main memory buffers the CPU from the disk, system performance for conventional applications is often limited by disk access speed. Thus, it has been seen as necessary for improving overall system performance to increase memory size and data access speed of disk drive units. For a discussion of this, see Michelle Y. Kim, "Synchronized Disk Interleaving", *IEEE Transactions On Computers*, Vol. C-35, No. 11, November 1986.

A variety of techniques have been utilized to improve data access speed. Disk cache memory capable of holding an entire track of data has been used to eliminate seek and rotation delays for successive accesses to data on a single track. Multiple read/write heads have been used to interleave blocks of data on a set of disks (data striping) or on a set of tracks on a single disk. Common data block sizes are byte size, word size, and sector size. Disk interleaving is a known supercomputer technique for increasing performance, and is discussed, for example, in the above-noted article.

While data striping yields advantages in data bandwidth, it unfortunately reduces the mean time to failure, which varies inversely with the number of disks in the array used to store the data. To correct for this decreased mean time to failure of the system, error recognition and correction has been added to the data to produce so called Redundant Arrays of Inexpensive Disks (RAID) architectures. Five types of RAID architecture are referred to as RAID levels 1–5. See, David A. Patterson, et al., "A Case for Redundant Arrays of Inexpensive Disks (RAID)", Report No. UCB/CSD 87/89, December, 1987, Computer Science Division (EECS), University of California, Berkeley, Calif. 94720.

RAID level 1 utilizes complete duplication (mirroring) of data from a primary disk to a backup disk. RAID level 1 has been primarily regarded as a data redundancy scheme to provide fault tolerance. Because of its relatively small performance per disk ratio over a conventional drive it has rarely been used in other applications.

RAID level 2 improves on the performance of RAID level 1 as well as increasing the capacity per disk ratio by utilizing error correction codes that enable a reduction of the number of extra disks needed to provide data and disk failure recovery. In RAID level 2, data is interleaved onto a group of G data disks and error correction codes (ECC) are generated and stored onto an additional set of C disks referred to as "check disks" to detect and correct a single error. The ECC are used to detect and enable correction of random single bit errors in data and also enables recovery of data if one of the G data disks crashes. Since only G of the C+G disks carries user data, the performance per disk is proportional to G/(G+C). G/C is typically significantly greater than 1, so RAID level 2 exhibits and improvement in performance per disk over RAID level 1. One or more spare disks can be included in the system so that if one of the disk drives fails, the spare disk can be electronically switched into the RAID to replace the failed disk drive.

RAID level 3 is a variant of RAID level 2 in which the error detecting capabilities that are provided by most existing inexpensive disk drives are utilized to enable the number of check disks to be reduced to one, thereby increasing the relative performance per disk over that of RAID level 2. Typically parity data is substituted for ECC. Either ECC, some other error code, or parity data may be termed redundant data. For both RAID levels 2 and 3 the transaction time for disk accesses for large or grouped data is reduced because bandwidth into all of the data disks can be exploited.

The performance criteria for small data transfers, such as is common in transaction processing, is known to be poor for RAID levels 2 and 3 because data is interleaved among the disks in bit-sized blocks, such that even for a data access of less than one sector of data, all disks must be accessed. To improve this performance parameter, in RAID level 4, a variant of RAID level 3, data is interleaved onto the disks in sector interleave mode instead of in bit interleave mode as in levels 1–3. In other words, individual I/O transfers involve only a single data disk. The benefit of this is from the potential for parallelism of the input/output operations. This reduces the amount of competition among separate data access requests to access the same data disk at the same time.

The performance of RAID level 4 remains limited because of access contention for the check disk during write operations. For all write operations, the check disk must be accessed in order to store updated parity data on the check disk for each stripe (i.e., row of sectors) of data into which data is written. Patterson et al. observed that in RAID level 4 and level 5, an individual write to a single sector does not involve all of the disks in a logical mass storage device since the parity bit on the check disk is just a single exclusive OR of all the corresponding data bits in a group. In RAID level 4, write operations interfere with each other, even for small data accesses. RAID level 5, a variant of RAID level 4, mitigates the contention for access to the parity data problem on write operations by distributing the parity check data and user data across all disks.

While various RAID architectures have successfully met data processing demands for increased bandwidth, the application of striped disks or RAID to real time reproduction of independent video segments on a plurality of processors has been less successful. Full motion video playback differs from conventional data transfers such as copying files or accessing a spreadsheet in that it requires a sustained high data rate rather than a burst of data. The data is also time critical. As little as a 0.5 second delay in data delivery can result in the reproduced video breaking up. Full motion video playback on a plurality of platforms over a network complicates data recovery by introducing contention issues as well.

In RAID levels 4 and 5 the independent sources of demand for data can result in all requests from around a network occasionally falling on just one drive. This inevitably results in failure to recover data quickly enough to meet the real time reproduction demands.

Striping and RAID levels 2 and 3 also fail. Striping and RAID levels 2 and 3 were intended to meet a small number of sequential requests for massive quantities of data. To meet this end they increased bandwidth. However, they do nothing to improve performance in terms of seek time and rotational latency, since the disks are conventionally synchronized. No advantage is gained in meeting multiple non-sequential requests.

The various RAID architectures were conceived as tools for closing the gap between Input/output performance and CPU performance. However, multimedia data is typically stored in compressed formats not suitable for conventional data processing. Compression also relieves bandwidth problems to and from a disk. Because of the vast quantities of data required to store images, compression of video data is a requirement if more than a few minutes of video is to be stored on disk in a digital format. Decompression of these formats is a processor intensive operation. In fact, when it comes to handling some types of compressed digital video data, central processing units such as the Intel 8088, 80286 and 80836SX microprocessors cannot keep up with the rate at which a conventional disk drive recovers the data. Thus the problem of handling video reproduction on a network is not the conventional one of a mismatch between CPU operating speed and disk drive data recovery speed, it is one of data dispatch from the disk drive. The support of fully interactive multimedia applications, especially full motion video and audio, on a plurality of network nodes, or for a plurality of applications running on a multitasking computer, presents different problems than conventional data processing.

SUMMARY OF THE INVENTION

It is an object of the present invention to a provide a system and method of reproducing asynchronous full motion video on a plurality of nodes of a network from a Redundant Array of Inexpensive Disks type mass storage system.

These and other objects of the invention are achieved as is now described. The invention provides a RAID system supporting multimedia for a plurality of playback platforms making independent requests for reproduction of video segments. The method of the invention reproduces full motion video on the plurality of playback platforms by storing duplicate video segments on each of a plurality of direct access storage devices. In response to a request for a video segment, a direct access storage device for retrieval of the video segment is selected from among devices listed in a drive information table. The selected direct access storage device is then instructed to retrieve the video segment. Finally, the drive information table is updated to reflect use of the selected direct access storage device for retrieval. As video segments complete, the drive information table is also updated to reflect freeing of the device.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a data structure utilized in supporting allocation of disk drives to support video requests on either the network of FIG. 1 or the network of FIG. 2;

FIG. 4 is a logical flow chart of the operation of a file server as modified to practice the invention; and FIG. 5 is a logical flow chart of a router operation for video requests utilized to practice the invention.

DETAILED DESCRIPTION OF THE INVENTION

Figure 1:
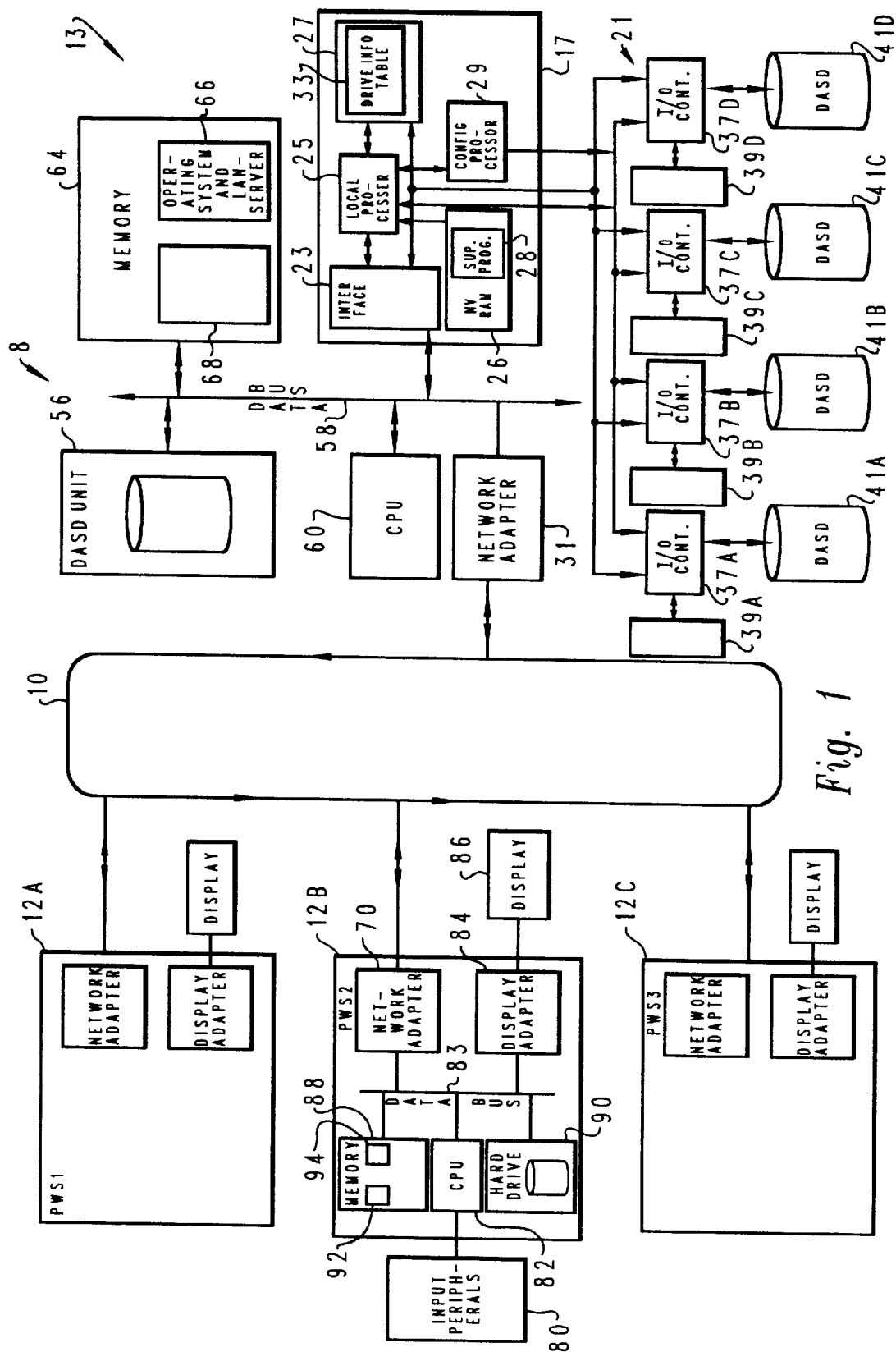
FIG. 1 is a high level block diagram of a data processing network including a redundant array of inexpensive disks attached to a file server for the network.

Now with reference to FIG. 1, there is depicted a block diagram of local area network 8 for supporting full motion video playback on a plurality of workstations 12A–12C over a token ring communications link 10. While a token ring geometry is depicted, the invention is applicable to other geometries of local area network as well as wide area networks. Preferably though, the network used will be an even distribution network, which prevents any one node from monopolizing traffic over the communications channel. A server 13 provides data storage and recovery for each of workstations 12A–12C, and may be provided by a conventional personal computer such as an IBM Personal System/2 or an IBM RS/6000 midrange computer system programmed to practice this invention. Server 13 includes a central processing unit 60, a memory 64, and a network adapter 31 for formatting outgoing transmissions and for deformatting incoming transmissions. Server 13 may include a conventional hard drive unit 56 providing storage for server processes. During operation memory 64 provides storage for a set of routines constituting an operating system and LAN server 66, as well as other objects 68.

Full motion video data is stored on a plurality of direct access storage device (DASD) units 41A–41D. Each full motion video segment is fully replicated or mirrored on each of DASD units 41A–41D, meaning that there are as many copies of the segment as there are units 41A–41D. Units 41A–D constitute a RAID system 21. Full motion video data files are stored using a digital video technology such as digital video interactive (DVI) technology, IBM Ultimotion or Intel Indeo. Digital video allows users to play full motion video over a 16 megabits per second token ring LAN. Each client of the LAN may play a different file, or a different portion of one file. The digital video files used are compressed using a variety of compression technologies.

RAID system 21 may be expanded by attaching additional DASD units 41X. RAID router 17 provides for distributing data blocks to and recovering data blocks from RAID system 21. Router 17, as its name implies, routes requests for a full motion video segment from a workstation 12X to a particular DASD unit for servicing. Router 17 comprises an interface 23 to an internal server bus 58 which in turn is connected to a network adaptor 31. Network adaptor 31 provides an interface to token ring communications link 10.

A configuration processor 29 is connected to local processor 25 and to RAID system 21. Configuration processor 29 is utilized to exercise newly connected DASD units 41X to generate performance information which is used to rate the unit to a maximum number of streams of video data sustainable from the unit. After generation of a performance rating for a drive 41X, the information is passed to local processor 25 which adds an entry to a drive information table 33 stored in buffer 27. Fixed parameters of drive information table 33 may be stored to a DASD unit 41X or to nonvolatile storage 26 to protect against their loss to a loss of power.

Local processor 25 executes a supervisory program 28 shown stored in non-volatile RAM 26 to carry out request allocation functions. Data is passed from router 17 to redundant array 21 through a plurality of input/output controllers 37a through 37d. Each of input/output controllers 37a–d has access to a local buffer 39a–39d, respectively, and controls a direct access storage device or disk drive 41a–41d, respectively.

Users may independently access full motion video segments stored on RAID system 21 through workstations 12A–12C. Workstation 12B is illustrated in greater detail. Workstation 12B communicates with server 12 over token ring link 10. Schematically the personal workstation 12B is similar to server 13, and includes a network adapter 70, a display adapter 84, a hard drive unit 90, a central processing unit (CPU) 82 and an addressable memory 88. Components of personal workstation 12B transfer data over an internal data bus 83. CPU 82 directly controls input peripherals 80 which may include a keyboard, a mouse, or both. CPU 82 may decompresses video data received from server 13 and refreshes a video frame 94 stored in memory 88 or stored in a video buffer in display adaptor 84. Display adapter 84 drives a display device 86, upon which full motion video is reproduced. For PVI video the display adapter 84 decompresses the video data, not the CPU. Memory 88 includes its own operating system and command structure 94 for use in establishing a communications session on network 8.

Figure 2:
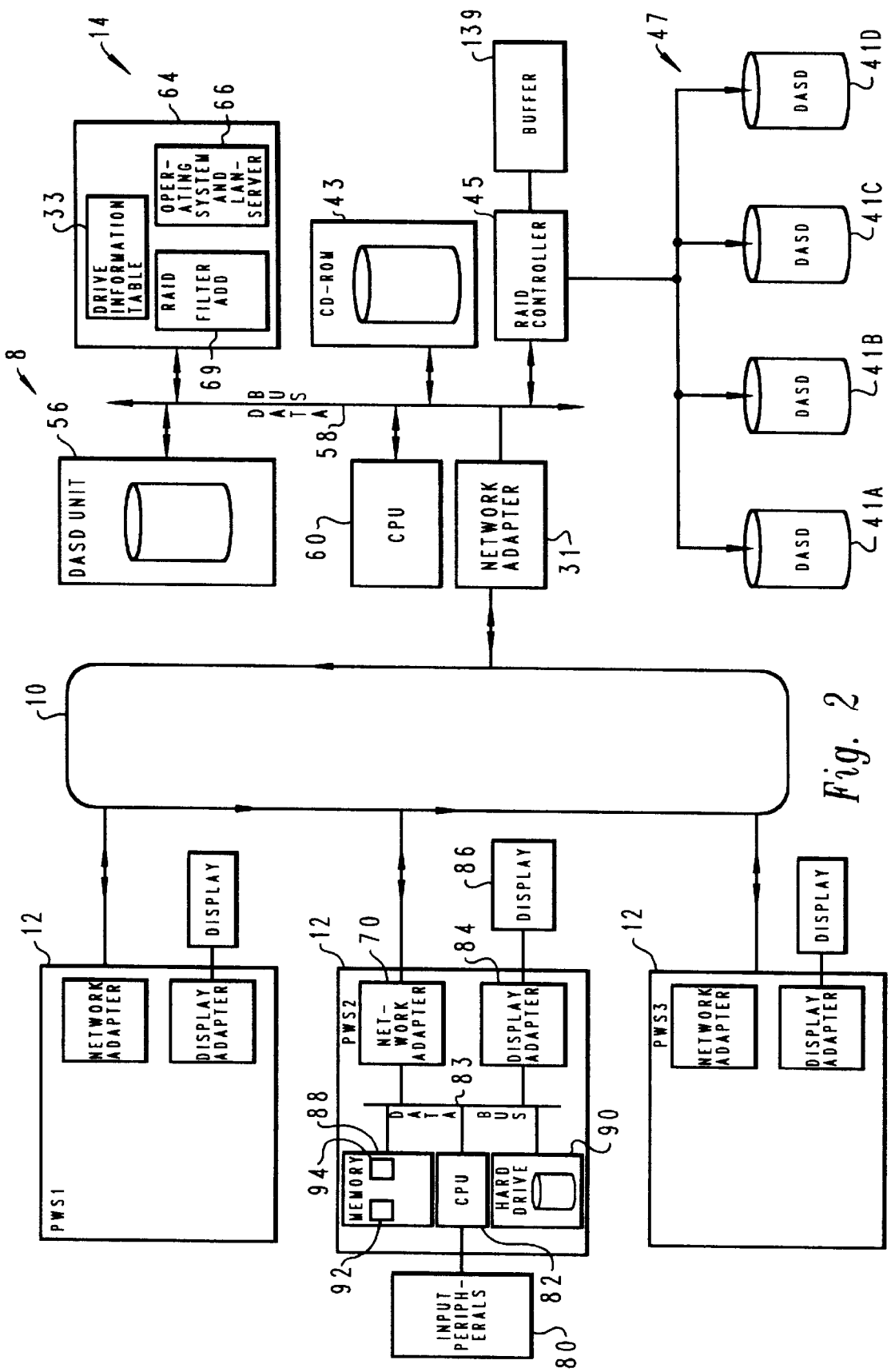
FIG. 2 is a high level block diagram of a data processing network including a file server programmed to implement a redundant array of inexpensive disks on a plurality of direct access storage devices.

FIG. 2 depicts an alternative arrangement for a server 14 in a network 8. Server 14 is described in so far as it differs from server 13 described above. In server 14, operating system 66 is the OS/2 version 2.X operating system with IBM OS/2 LAN server 3.0 for service as a network server. The functions of RAID router 17 are now provided by RAID function filter Adaptor Device Driver (ADD) 69 associated with operating system 66. DASD unit 56, CD-ROM 43 and RAID subsystem 47, implemented by RAID controller 45, may all be treated as drives within the RAID system implemented through RAID filter ADD 69. Drive information table 33 is now located in system memory 66. In effect, RAID subsystem 47 becomes a cascaded RAID unit and appears to the RAID system implemented with RAID filter ADD 69 to be simply another DASD unit. RAID controller 45 utilizes a buffer 139 in conventional fashion.

Adaptor device drivers are hardware dependent modules and are members of the lowest layer in the device driver hierarchy. In the OS/2 operating system, the ADD to Device manager interface has been designed in such a way that an ADD is little more than a state machine, which is responsible for moving blocks of data between an input/output device and system memory. A filter ADD is a filtering algorithm that can be inserted between the OS/2 Device Manager and the ADD which is driving the device interface. Such filter algorithms are packaged as ADD model device drivers A filter ADD is installed into the call down path, between the Device Manager and the device interfacing ADD.

The RAID filter ADD 69 acts as a request router to the drives in the RAID subsystem 47.

FIG. 3 illustrates drive information table 33 as a data structure for storage in either system memory or in a router buffer. Drive information table 33 includes an entry 109 for each drive within the RAID system. Each entry 109 has at least four fields including: a drive ID field 101; a status flag field 103, a maximum number of streams supported fields 105; and a number of streams currently supported field 107. Drive ID fields 101 may include the drive letter identification or any alphanumeric character. The status field flag 103 may be a 1 to indicate a drive is available and a 0 to indicate that the drive is off-line. The maximum number of streams supported fields 105 may be an integer, though in some embodiments of the invention the figure could a data rate. The number of streams in use field 107 is also typically an integer, and is limited by the number in field 105. If the value in field 105 is a data rate than the number in field 107 will also be a data rate. For OS/2 operating system based LAN servers utilizing the high performance file system (HPFS), the data rate requirements of a digital full motion video request may be stored as an extended attribute (EA) attached to the actual digital full motion video file. The extended attribute in such cases indicates the required playback rate. The network bandwidth may then be guaranteed the requesting workstation.

The status flag field 105 allows the system to account for drive failures within the RAID array. As long as one drive is operable, the array remains "up" and accessible to the user. User notification of drive failures should be consistent with existing RAID level 1 implementations. For example, in some LAN server implementations, e.g. the OS/2 LAN server version 3.0, a user can receive a notification or alert when a drive in an array fails. Adding additional or replacing a failed drive should not require the user to reformat the array.

FIGS. 4 and 5 are logical flow charts illustrating, respectively, operation of a file server within a server operating system in so far as it pertains to the invention and operation of a router for allocating DASD units to requests for video data. The file server program is entered at step 201, which provides for handling of video requests from and delivery of video data or failure to connect messages to a network. Next, at step 203 incoming requests for video file data is output to a router. Step 205 provides for receiving video data or a failure to connect message from the router. Programming then returns to step 201.

The router program is entered at step 211 which allows for receipt of a request for video connection forwarded by the file server. If no request for a connection is received processing may advance to step 223 to determine if a video segment has completed. If a request for a video connection is received, an access to the drive information table is done at step 213 to recover drive availability information, i.e. is the drive running and is it supporting fewer than its maximum number of contemporaneous data streams. At step 215 it is determined if a drive is available. If a drive is available, the YES branch is taken from step 215 to step 217 where it is determined which of the available drives is to be assigned the outstanding request. Next, at step 219 the appropriate commands to retrieve the selected video on the selected DASD unit are forwarded to the drive controller for the assigned DASD unit. At step 221 the drive information table is updated. Finally, step 223 is executed to determine if any earlier requested video segments have concluded. If such a video segment has concluded, processing is returned to step 221 for update of the drive information table. If no video segment has completed processing follows the NO branch back to step 211.

It is always possible that all drives are in use when a video request is received. As stated above, step 215 provides for determining if a drive is available. If no drive is available, the NO branch is followed from step 215 to step 225, whereupon a failure to connect indication is returned to the file server.

By utilizing a RAID control scheme for managing a plurality of mirrored DASD units data upkeep is simplified over a scheme where multiple drives with duplicate data are managed directly by a network system administrator. Logically an update is applied to only one drive.

Balancing the number of users per DASD unit is automatically done by the RAID router or filter (ADD) of the present invention. All users are using the same logical drive from the perspective of the server. Initial planning on the maximum number of users is done as setup time by the network system administrator to determine the number of drives required in the array. If additional drives are ever needed, they are readily added.

The invention mitigates drive letter exhaustion problems and provides complete user transparency. A single drive can be accessed by any workstation.

While the invention has been particularly shown and described with reference to a preferred embodiment, it will be understood by those skilled in the art that various changes in form and detail may be made therein without departing from the spirit and scope of the invention.

What is claimed is:

1. A method of delivering full motion video on a plurality of playback platforms connected to a single file server over a network, the method comprising:
    storing duplicate video segments on each of a plurality of direct access storage devices within a RAID system which is controlled by the single file server;
    responsive to a request from a playback platform to the single file server, selecting a direct access storage device for retrieval of the video segment from a drive information table;
    instructing the selected direct access storage device to retrieve the video segment;
    updating the drive information table to reflect use of the selected direct access storage device for retrieval; and
    transmitting the video segment from the selected direct access storage device to the playback platform over the network.

2. The method according to claim 1, wherein the step of selecting includes:
    accessing the drive information table to retrieve availability information for each of the plurality of direct access storage devices;
    if one or more direct access storage devices is available, assigning one of the available direct access storage devices to support the video request.

3. The method according to claim 2, wherein the step of selecting further includes:
    if no direct access storage device is available, signalling a failure to connect to the playback platform.

4. The method of claim 3, and further comprising:
    responsive to a request from the playback platform for a video segment, forwarding the request to a router controlling access to the plurality of direct access storage devices.

5. The method of claim 4, wherein the step of selecting is performed from the router.

6. The method of claim 3, wherein the step of selecting is performed from a device driver.

7. The method of claim 3, wherein playback of a plurality of video segments is simultaneously supported.

8. The method of claim 7, wherein the playback of the plurality of video segments occurs on a plurality of playback platforms.

9. A data processing system comprising:
    a plurality of playback platforms;
    a single file server;
    a network interconnecting the plurality of playback platforms and the single file server;
    a RAID system comprising a plurality of direct access storage devices;
    a drive information table providing status indications for each of the direct access storage devices;
    a plurality of duplicate video segments recorded on each of the plurality of direct access storage devices;
    means responsive to a request for a video segment from a playback platform to the file single server for selecting a direct access storage device for retrieval of the video segment by reference to the drive information table;
    means for instructing the selected direct access storage device to retrieve the video segment;
    means for transmitting the video segment from the selected direct access storage device to the playback platform; and
    means for updating the drive information table to reflect use of the selected direct access storage device for retrieval.

10. The data processing system according to claim 9, wherein the means for selecting includes:
    means for accessing the drive information table to retrieve availability information for each of the plurality of direct access storage devices;
    means responsive to one or more direct access storage devices being available for assigning one of the available direct access storage devices to support the video request.

11. The data processing system according to claim 10, wherein the means for selecting further includes:
    means responsive to no direct access storage device being available for signalling a failure to connect to the playback platform.

12. The data processing system of claim 11, and further comprising:
    means responsive to the request from the playback platform for a video segment for forwarding the request to a router controlling access to the plurality of direct access storage devices.

13. The data processing system of claim 12, wherein the means for selecting is the router.

14. The data processing system of claim 11, wherein the means for selecting is a device driver.

15. The data processing system of claim 12, wherein playback of a plurality of video segments is simultaneously supported.

16. The data processing system of claim 15, wherein the playback of the plurality of video segments occurs on a plurality of playback platforms.

* * * * *